US009533766B2

(12) United States Patent
Cailleteau (10) Patent No.: US 9,533,766 B2
(45) Date of Patent: Jan. 3, 2017

(54) KINEMATIC SEAT WITH ELASTIC PIVOT (75) Inventor: Jeremy Cailleteau, St Aout (FR)

(73) Assignee: Zodiac Seats France, Issoudun (FR)

( * ) Notice: Subject to any disclaimer, the term of this patent is extended or adjusted under 35 U.S.C. 154(b) by 164 days.

(21) Appl. No.: 13/476,051

(22) Filed: May 21, 2012

(65) Prior Publication Data
US 2012/0292967 A1 Nov. 22, 2012

Related U.S. Application Data (60) Provisional application No. 61/488,326, filed on May 20, 2011.

(51) Int. Cl.
B64D 11/06 (2006.01)
B60N 2/20 (2006.01)
B60N 2/44 (2006.01)
A47C 3/00 (2006.01)
A47C 7/44 (2006.01)
A47C 11/00 (2006.01)
B60N 2/22 (2006.01)
B60N 2/68 (2006.01)
(Continued)

(52) U.S. Cl.
CPC ............. B64D 11/064 (2014.12); A47C 1/12 (2013.01); A47C 7/445 (2013.01); A47C 7/446 (2013.01); A47C 11/005 (2013.01); B60N 2/028 (2013.01); B60N 2/22 (2013.01); B60N 2/2209 (2013.01); B60N 2/23 (2013.01); B60N 2/68 (2013.01); B60N 2/682 (2013.01); B64D 11/06 (2013.01); B64D 11/0649 (2014.12)

(58) Field of Classification Search
CPC ............. B60N 2/028; B60N 2/22; B60N 2/68; B60N 2/2209; B60N 2/23; B60N 2/682; B64D 2011/0606; B64D 2011/0617; B64D 11/0649; B64D 11/06; B64D 11/064; A47C 7/445; A47C 7/446; A47C 11/005; A47C 1/12
USPC .......................................... 297/285, 296, 297
See application file for complete search history.

(56) References Cited

U.S. PATENT DOCUMENTS 2,732,005 A * 1/1956 Corning ................. A47C 7/445
297/301.1
3,188,142 A * 6/1965 Probst .................... A47C 7/285
267/105
(Continued)

FOREIGN PATENT DOCUMENTS

FR 1291043 4/1962
JP 13010064 Y 1/1938
(Continued)

OTHER PUBLICATIONS

International Search Report and Written Opinion dated Aug. 7, 2013 in Application No. PCT/IB2012/001091.
(Continued)

Primary Examiner — David R Dunn
Assistant Examiner — Tania Abraham
(74) Attorney, Agent, or Firm — Kilpatrick Townsend & Stockton LLP; Dean W. Russell; Kristin M. Crall (57) ABSTRACT Embodiments of the present invention provide an improved pivot articulation for a kinematic seat. Certain embodiments provide an elastic pivot that is formed as flexion weaves that connect upper and lower portions of a seat back. The flexion weaves may be inner and outer legs that are curved in configuration or that have bent dimensions.

13 Claims, 7 Drawing Sheets (51) Int. Cl.
*A47C 1/12* (2006.01)
*B60N 2/02* (2006.01)
*B60N 2/23* (2006.01)

(56) References Cited

U.S. PATENT DOCUMENTS

| | | | | |
|---|---|---|---|---|
| 4,549,764 | A | * | 10/1985 | Haedo ............................ 297/296 |
| 4,618,185 | A | * | 10/1986 | Kaufman ........................ 297/285 |
| 4,787,672 | A | * | 11/1988 | Werner .......................... 297/296 |
| 5,904,397 | A | * | 5/1999 | Fismen .......................... 297/291 |
| RE36,335 | E | * | 10/1999 | Perry ..................... A47C 1/032 297/239 |
| 6,027,167 | A | * | 2/2000 | Blomdell et al. ........... 297/216.1 |
| 6,488,335 | B1 | * | 12/2002 | Cioncada .................... 297/300.2 |
| 7,073,864 | B2 | * | 7/2006 | Olsen ....................... A47C 3/04 297/18 |
| 7,384,100 | B2 | * | 6/2008 | Perry et al. ................... 297/286 |
| 2005/0269451 | A1 | | 12/2005 | Schumacher et al. |
| 2007/0228794 | A1 | * | 10/2007 | Penley ........................ 297/354.1 |

FOREIGN PATENT DOCUMENTS

| | | |
|---|---|---|
| JP | 61129557 | 8/1986 |
| JP | 2-47873 | 12/1990 |
| JP | 2005-335703 | 12/2005 |
| WO | 03059123 | 7/2003 |
| WO | 2012160443 | 11/2012 |

OTHER PUBLICATIONS

Zelenika et al., "Analytical and experimental characterisation of high-precision flexural pivots subjected to lateral loads", Precision Engineering, vol. 26, No. 4, Oct. 31, 2002, pp. 381-388.
International Preliminary Report on Patentability dated Nov. 28, 2013 in Application No. PCT/IB2012/001091.
China Patent Application No. 201280024277.7, Office Action (and English translation) dated Jul. 10, 2015.
China Patent Application No. 201280024277.7, Office Action (and English translation) dated Feb. 22, 2016.
Japan Patent Application No. 2017-510899, Office Action (and English Translation) dated Jan. 26, 2016.
Chinese Patent Application No. 201280024277.7, Office Action (and English translation) dated Jul. 14, 2016.
Japan Patent Application No. 2014-510899, Office Action (and translation) dated Aug. 30, 2016.

* cited by examiner

KINEMATIC SEAT WITH ELASTIC PIVOT

CROSS REFERENCE TO RELATED APPLICATIONS

This application claims the benefit of U.S. Provisional Application Ser. No. 61/488,326, filed May 20, 2011, titled "Seat Kinematic with Elastic Pivot," the entire contents of which are hereby incorporated by reference.

FIELD OF THE INVENTION

Embodiments of the present invention relate generally to an improved pivot articulation for a kinematic seatback.

BACKGROUND

Many seats are designed to allow occupants to move from a fully seated upright position to a partially or fully reclined position. These seats may allow only a slight backward motion, or they may be seats that are reclineable to a great degree. For example, aircraft and other passenger transport vehicles, such as trains or buses, often have seats that recline or otherwise have a backrest with some "give" motion. This lends itself to passenger comfort, as movement of the vehicle may be turbulent or bumpy, and comfortable seats preferably have backrest portions with at least some resilience. Premium seats for vehicles may also have a seat pan that is adjustable, such that forward and backward movement of the seat pan is allowed, while reclining motion of the backrest is also allowed. Seats for theatres, auditoriums, stadiums, home and/or office use may also benefit from having a hinged or "spring back action" backrest portion, as sitting completely upright without any "give" or elastic resilience for extended periods of time can be uncomfortable.

If provided, pivot articulation points for kinematic seatbacks are typically provided by classic pivot points, comprised of a pin and lugs. These classic pivots have several problems that prevent their desirable use in certain kinematic seats. For example, the combination of the pin and lugs may have a weight that is greater than desirable for certain uses. The costs of components can be higher than desired, they can be noisy in use, they are subject to wear and tear due to friction, and they are further subject to loosening. It is thus desirable to provide an improved elastic point for a kinematic seat.

BRIEF SUMMARY

Embodiments of the invention described herein thus provide an improved pivot articulation for a kinematic seatback. Certain embodiments provide an elastic pivot that is formed as flexion weaves that connect upper and lower portions of a seat back. The flexion weaves may be inner and outer legs that are curved in configuration or that have bent dimensions. For example, there may be provided a kinematic seat, comprising: a seat frame, a seat pan, a seat backrest; and side beam supports positioned alongside the seat pan, the side beam supports providing an elastic pivot formed by at least two flexion weaves.

The flexion weaves may each include a leg having a first end and a second end, with the first end extending from the side beam support and the second end secured to the seat backrest. The flexion weaves may be formed from two legs that extend from a single branch point, each leg having a bend that divides each leg into an upper end and a lower end. Two flexion weaves may each have a curvature that allows movement of the seat backrest. In use, the flexion weaves generally cross one another to create an "X" configuration. The seat backrest may include an upper portion and a lower portion, and wherein the backrest rotates around the elastic pivot.

DETAILED DESCRIPTION

Particular use for the seats described herein is found on aircraft seats and other passenger transport vehicles, but the seats and components may be used for any reclining and/or pivoting seat, including for residential and/or commercial use. One reason these seat pivots are useful for aircraft seats is that weight, cost, and durability are of particular concern on aircraft, and thus, improved seat pivoting solutions find particular acceptance and desirability in the aircraft context. Although the remainder of this description will focus on the use of the described seats on aircraft and other passenger transport vehicles, it should be understood that the seats and components described may be used in any location, such as concert halls, stadiums, auditoriums, movie theatres, schools, home and office chairs, and so forth. The concepts are usable for individual/stand alone chairs, and also for chairs that are connected to one another in series. Additionally, although described as useful for chairs, the elastic pivots described herein may also be used for other mechanical devices that benefit from a pivoting motion without the use of pins and lugs.

Figure 1:
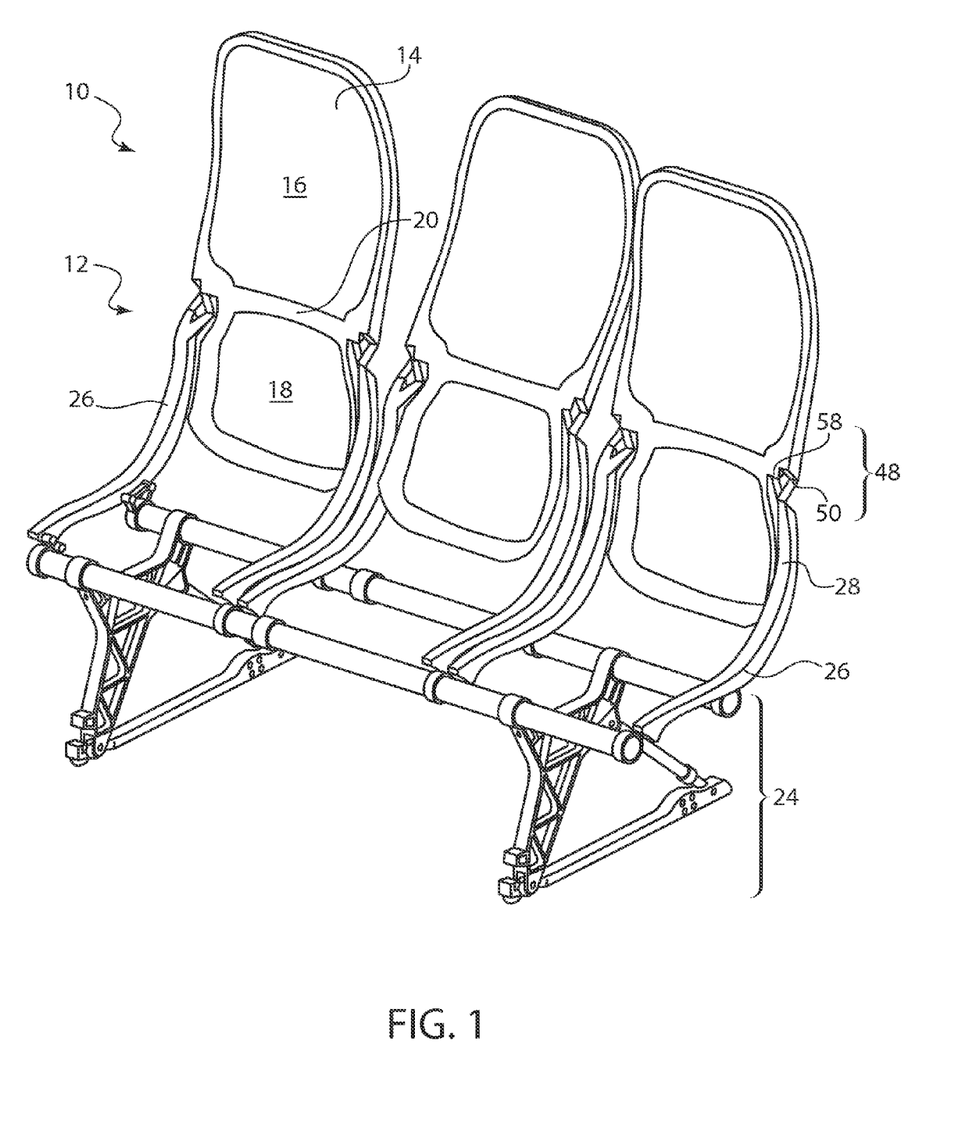
FIG. 1 shows a front perspective view of a series of seats on a seat frame, with the seats having elastic pivots on the backrests.
Figure 4:
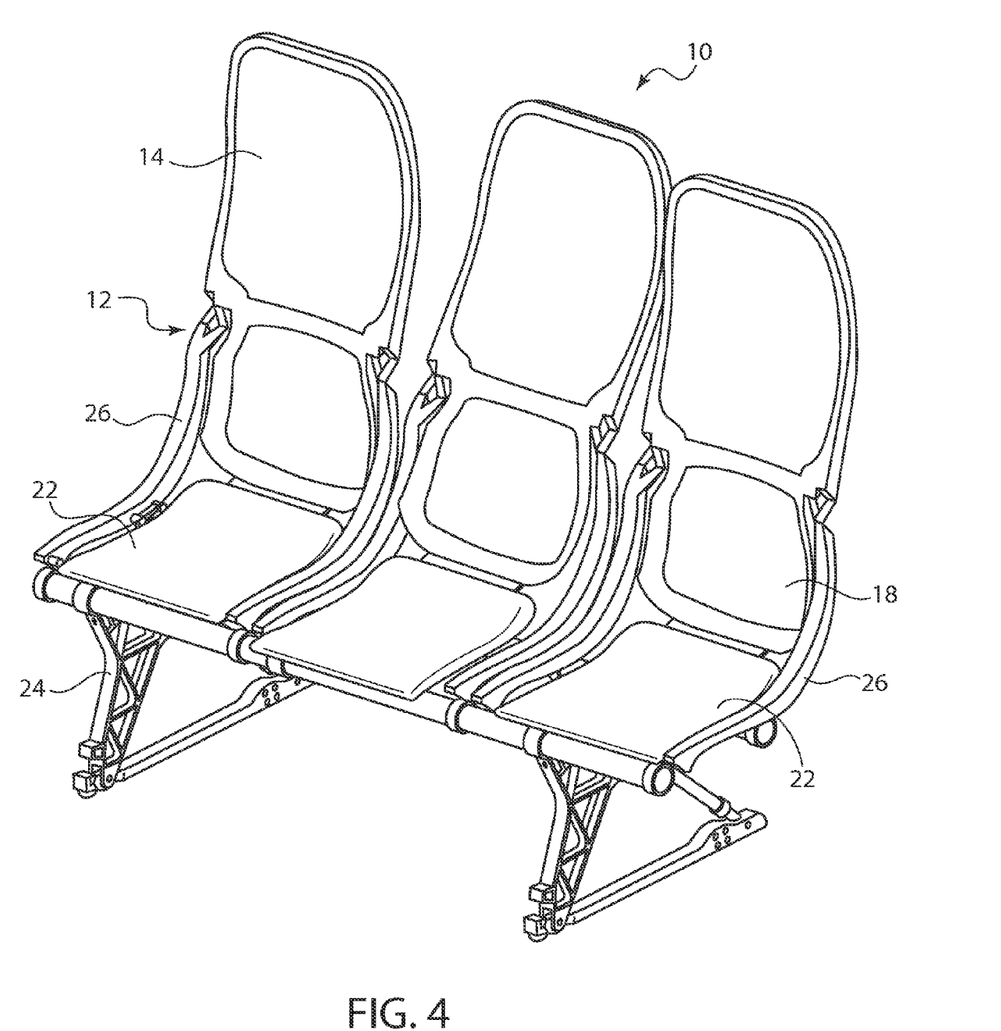
FIG. 4 shows the series of seats of FIG. 1 with the seat pans in place.

FIG. 1 shows a series of seats 10. The seats are shown as kinematic seats 10 with an elastic pivot 12 positioned on the backrest 14. Specifically, the backrest 14 is provided with an upper portion 16 and a lower portion 18. In the example shown, the upper 16 and lower 18 portions are divided by a mid portion 20, although mid portion 20 is not required. The seats also have a seat pan 22, as shown in FIG. 4. The seat pan 22 (not shown in FIG. 1 in order to show the lower seat frame 24) is generally provided as a separate component from the backrest 14, although it is envisioned that it is possible for all seat components to be provided as a single integral piece, if desired. However, the seat pan 22 is typically independently movable from the backrest 14. The seat pan is mounted on a lower seat frame 24. Movement of certain components of the lower frame 24 allows/causes movement of the seat pan 22.

Figure 8:
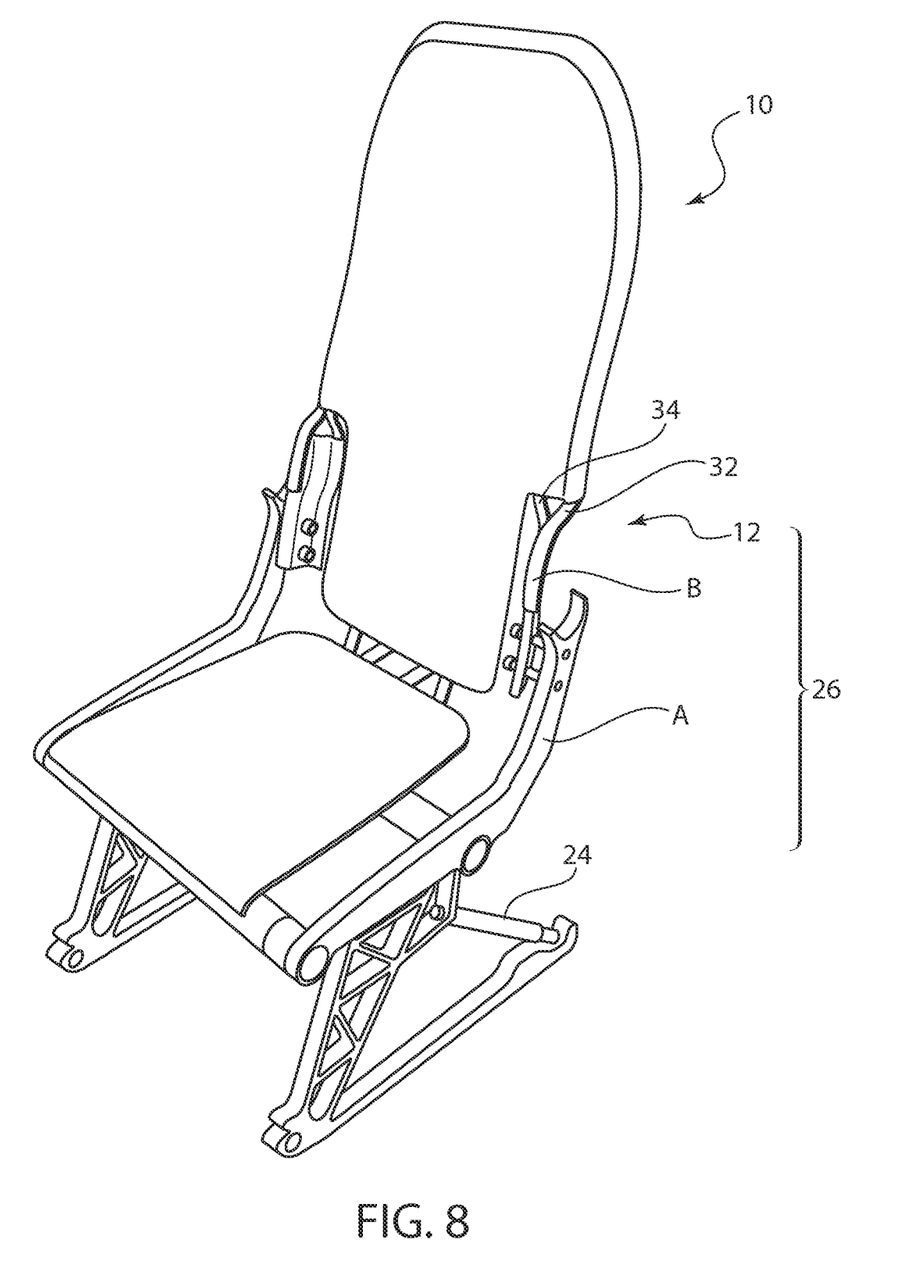
FIG. 8 shows an alternate seat with a two-part side beam support.

Alongside both sides of the seat pan 22 and generally attached the lower frame 24 are side beam supports 26. Side beam supports 26 are generally made of a rigid material having very little, if any, elasticity or give. An upper area 28 of each side beam support 26 provides components that form the elastic pivot 12. It may be possible that more than one element may be joined or otherwise work in cooperation to form side beam support 26. For example, FIG. 8 shows a first portion A of side beam support 26 and a second portion B of side beam support 26 that collectively cooperate to form the side beam support 26 and that perform the below-described functions. It may also be possible to provide more than two components that collectively form each side beam support 26. Side beam supports 26 generally cause the components of the elastic pivot to be indirectly coupled to the seat frame 24.

Figure 2:
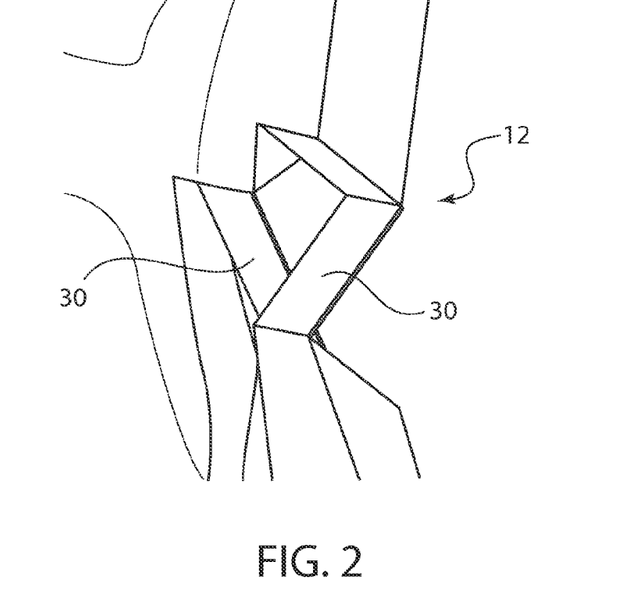
FIG. 2 shows a side perspective view of one embodiment of an elastic pivot.
Figure 6:
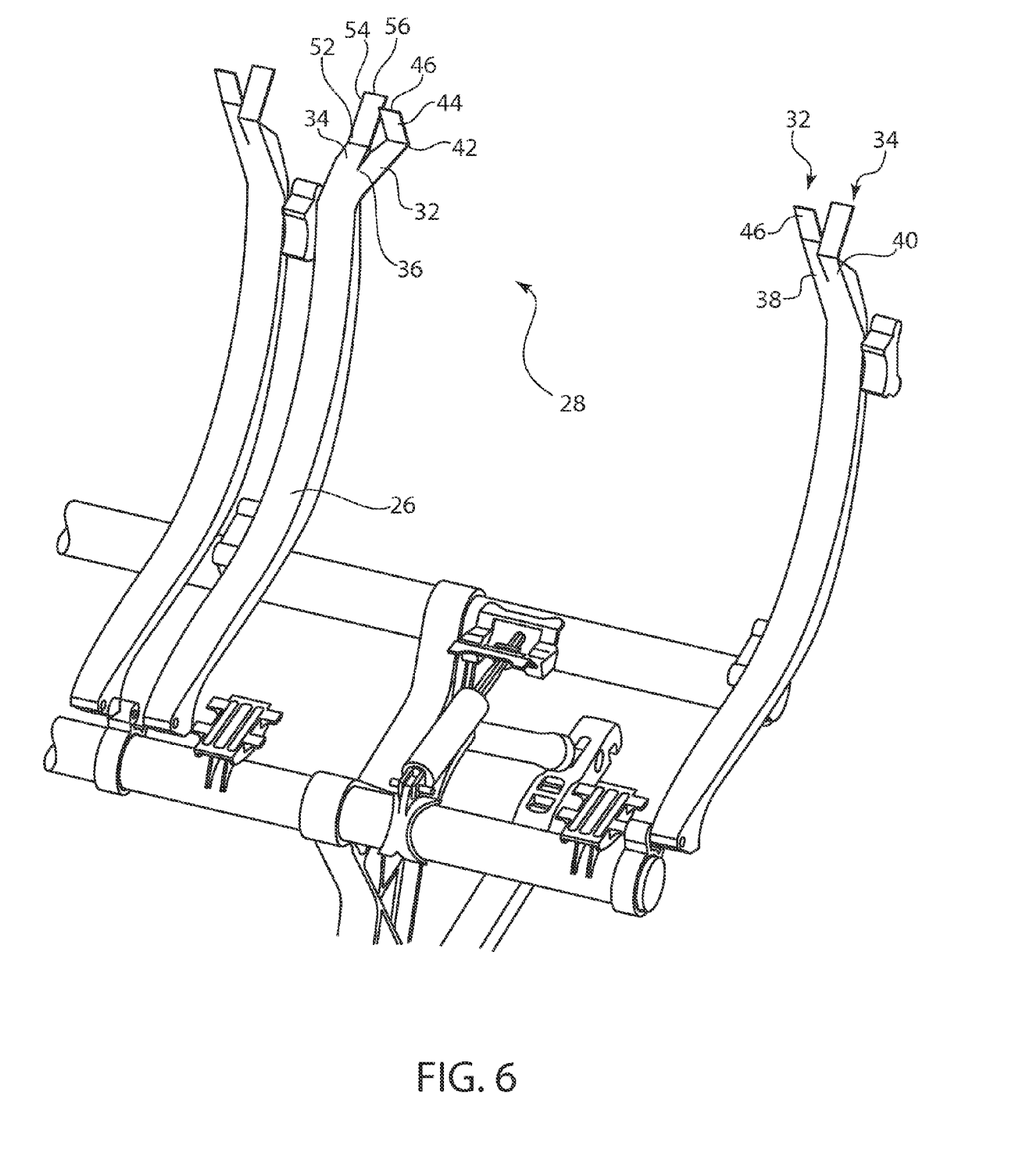
FIG. 6 shows the seat frame and side beam supports, supporting elastic pivots.

In the example shown, the elastic pivot 12 is formed by at least two crossing flexion weaves 30, shown in FIG. 2. (Although two flexion weaves and their components are shown in the figures, it should be understood that more than two flexion weaves may be used in order to provide a greater tension or in order to provide smaller legs but in greater numbers.) As shown in FIG. 6, the upper area 28 of side beam support 26 branches to form an inner leg 32 and an outer leg 34 Inner and outer legs 32, 34 form somewhat of a Y-shaped configuration at branch point 36. Branch point 36 provides the first ends 38, 40 of each of the legs 32, 34 Inner leg 32 has a bend 42 that forms an upper portion 44 of inner leg 32. The inner leg 32 has a second end 46 at the end of upper portion 44 that is secured to a connection portion 48 of the backrest 14, shown in FIG. 1. Inner leg 32 is generally secured to an inner area 58 of connection portion 48.

Figure 3:
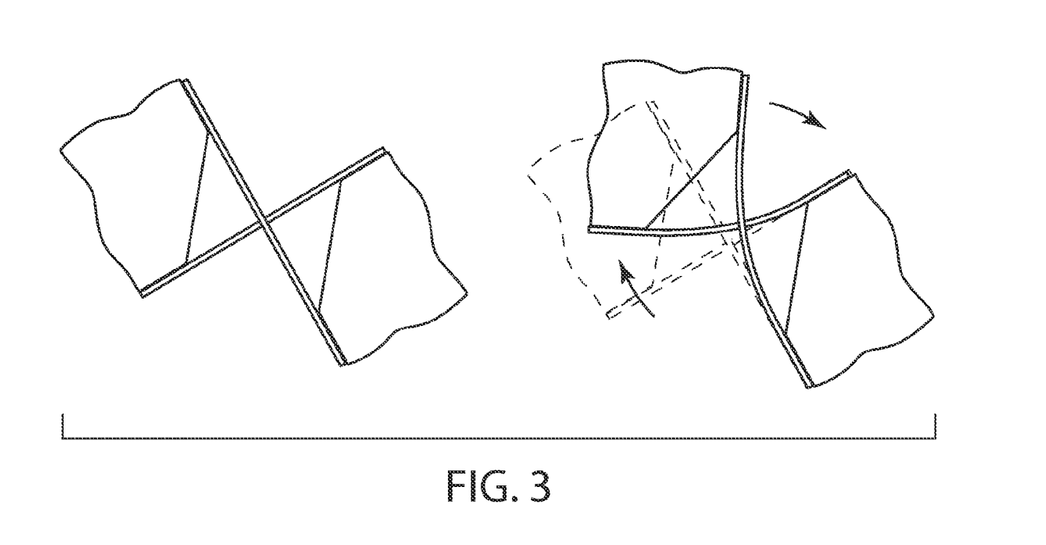
FIG. 3 shows side views of elastic pivot movement.

Outer leg 34 has a similar bend 52 that forms an upper portion 54 of outer leg 34. The outer 34 has a second end 56 at the end of upper portion 54 that is also secured to a connection portion 48 of the backrest 14 (Outer leg 32 is generally secured to an outer area 50 of connection portion 48.) The Y-shaped branch point 36 of the side beam 26 combined with the connection of the second ends 46, 56 to the connection portion 48 of the backrest 14 provide the elastic pivot 12. In this embodiment, the inner and outer legs 32, 34 cross each other in the vertical plane to form an "X" when viewed from the side, as shown in FIGS. 2 and 3.

It is entirely possible to create legs having greater curvatures, such that they cross in the horizontal plane as well. In other words, the inner leg 32 could be connected to the outer area 50 and the outer leg 34 could be connected to the inner area 58. This could create friction if not spaced properly, but it is one potential form for flexion weaves 30 to take.

Figure 7:
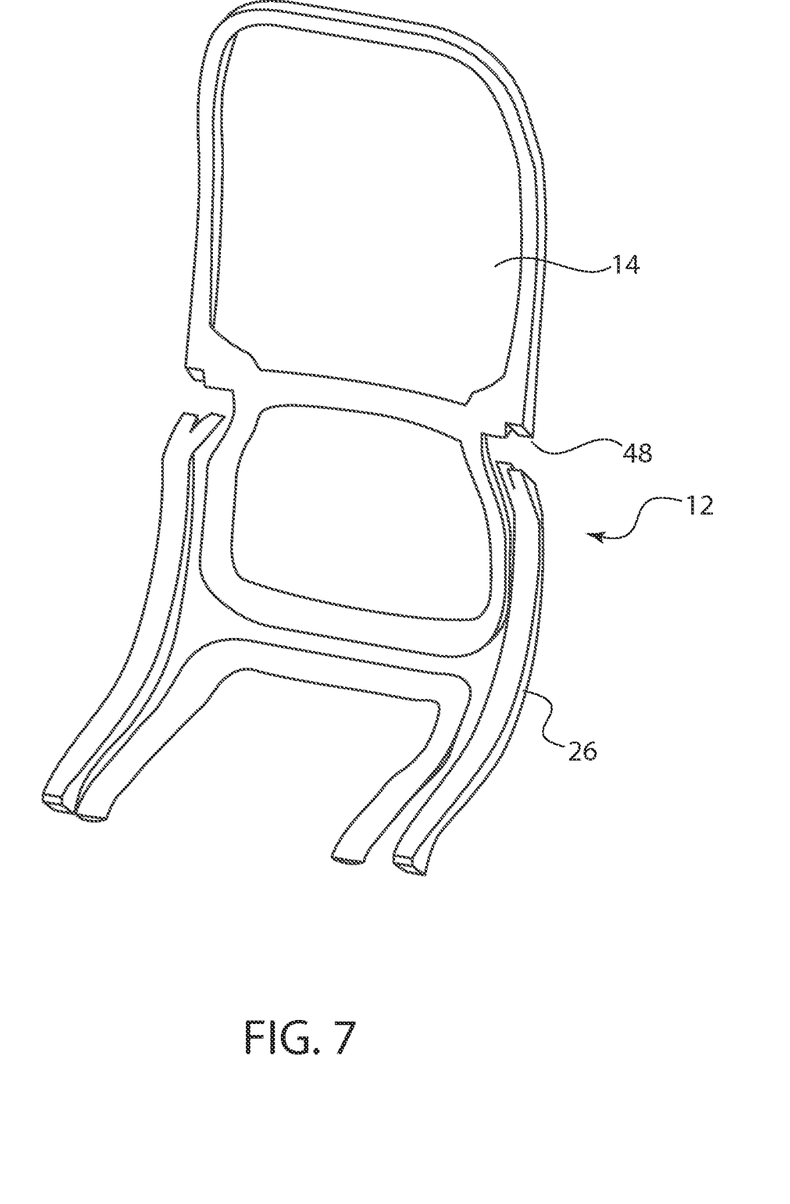
FIG. 7 shows a seat with only a lower portion of the elastic pivot shown, illustrating that alternate upper portions as possible.

In another embodiment, the flexion weaves 30 are formed by legs 32, 34 that do not have bends, but that remain generally straight in non-use and that curve slightly once tension is applied. Such legs are generally studier or thicker or otherwise designed to have more rigidity that the legs having bends in them because there is not as much push back with straight legs. In this embodiment, the push back feature is provided by the material itself. FIG. 7 is provided to illustrate that any upper shape of the elastic pivot is possible. FIG. 8 shows that legs 32, 34 may be curved, without specific bend points. This feature is also shown in FIG. 3.

In general, the elastic pivot point 12 acts like a fishing rod—it can bend, but it snaps back to its original configuration once pressure is released. However, one of the benefits provided by flexion weaves 30 being formed of two legs or parts is that just a single leg can bend and deform, but there is not a counter-balancing "spring back" leg. By providing two elastic ribs/legs, there is an opposition force provided by the opposite rib at connection points.

In use, as the seat pan 22 moves forward, the backrest 14 is allowed to recline. During this movement, the backrest 14 pivots about elastic pivot 12, in part due to the securement between the lower portion 18 of the backrest 14 and the seat pan 22 by the side beam supports 26. As the upper portion 16 of the backrest (the portion above the pivot axis) is going backward, the lower portion 18 moves forward when the seat 10 is reclining. Generally, in order to limit the backrest intrusion into the space of the passenger behind each seat 10, the pivot point may be moved as high as possible. (Although the figures shown one position for the pivot point on the backrest, it should be understood that the elastic pivot may be located anywhere along the backrest as desired.) Depending upon where the elastic pivot point 12 is positioned along the backrest 14, the amount of the upper portion of the backrest angling can be modified. In general, aircraft seats provide seats in a 15° from vertical position when fully upright, in the taxi, take-off and landing position. When reclined, aircraft seats typically recline to 30° from vertical. (These ranges are for aircraft seats in the passenger cabin; premium seats designed for overseas flights that recline to a sleeping position obviously fall outside these ranges and recline to a much greater degree.)

Because the backrest 14 is linked to the seat pan 22 (either directly or indirectly), when the seat pan 22 is moved forward and is then locked in place, the backrest 14 is allowed to recline. The lower portion 18 of the backrest could also be linked to the bottom seat pan 22, so that when the passenger is reclining the backrest, the bottom seat pan 22 is moving forward. To control the motion of the backrest 14 and the bottom seat pan 22, and if the bottom pan 22 and the backrest 14 are linked together, a device 60 attached to the seat pan 22 is used to lock the position, so that the recline of the back rest 14 is also controlled.

Figure 5:
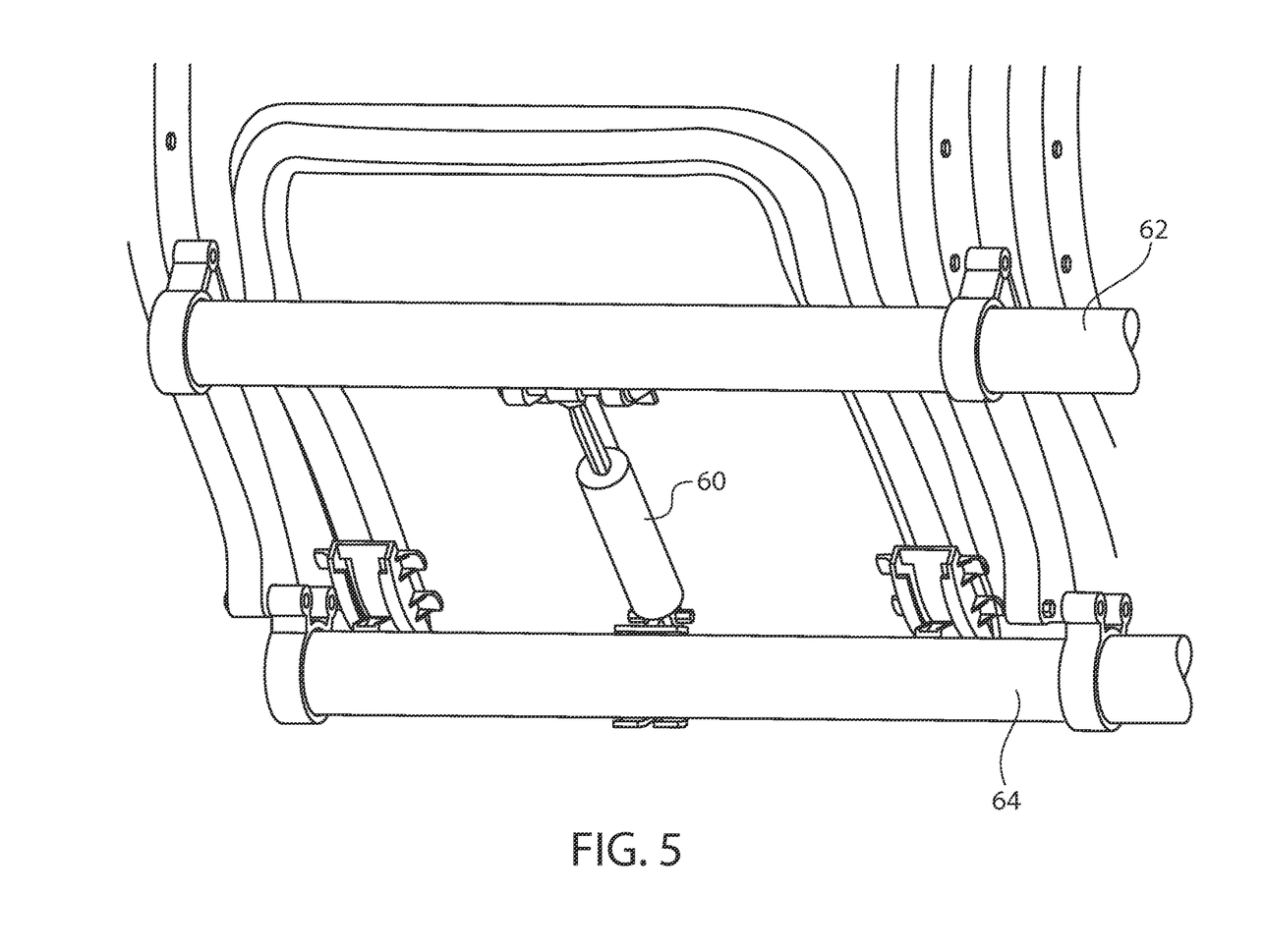
FIG. 5 shows a bottom rear view of the seat frame of FIG. 1.

For example, FIG. 5 shows a member 60 that is secured to bars 62, 64 of seat frame 24. Once the seat pan 22 is in the desired position, the seat occupant can lock member 60 in place to help control reclining motion of backrest 14.

Changes and modifications, additions and deletions may be made to the structures and methods recited above and shown in the drawings without departing from the scope or spirit of the invention and the following claims.

What is claimed is:

1. A kinematic seat, comprising:
   (a) a lower seat frame,
   (b) a seat pan,
   (c) a seat backrest that pivots with respect to the lower seat frame, and
   (d) left and right side beam supports supporting left and right elastic pivots positioned above the seat pan, each of the left and right elastic pivots extending from an end of the side beam support and comprising a first flexion weave and a second flexion weave, wherein the first flexion weave and the second flexion weave are arranged in an x-configuration such that they cross one another, wherein the first flexion weave and the second flexion weave are secured to and connect with the seat backrest, such that the seat backrest rotates and reclines with respect to the seat frame by pivoting at the elastic pivots,
   wherein each of the first and second flexion weaves curve slightly once tension is applied to allow movement of the seat backrest with respect to the seat frame.

2. A kinematic seat, comprising:
(a) a lower seat frame,
(b) a seat pan,
(c) a seat backrest that pivots with respect to the lower seat frame; and
(d) left and right side beam supports supporting left and right elastic pivots positioned above the seat pan, each of the left and right elastic pivots extending from an end of the side beam support and comprising a first flexion weave and a second flexion weave, wherein the first flexion weave and the second flexion weave are arranged in an x-configuration such that they cross one another, wherein the first flexion weave and the second flexion weave are secured to and connect with the seat backrest, such that the seat backrest rotates and reclines with respect to the seat frame by pivoting at the elastic pivots, wherein the seat is installed on a passenger transport vehicle.

3. The kinematic seat of claim 2, wherein the seat backrest comprises an upper portion and a lower portion, with the upper portion having a larger width than the lower portion, wherein each of the first and second flexion weaves comprise a first end and a second end, the first end extending from the end of the side beam support and the second end secured to the upper portion of the seat backrest.

4. A kinematic seat, comprising:
(a) a lower seat frame,
(b) a seat pan,
(c) a seat backrest that pivots with respect to the lower seat frame; and
(d) left and right side beam supports supporting left and right elastic pivots positioned above the seat pan, each of the left and right elastic pivots extending from an end of the side beam support and comprising a first flexion weave and a second flexion weave, wherein the first flexion weave and the second flexion weave are arranged in an x-configuration such that they cross one another, wherein the first flexion weave and the second flexion weave are secured to and connect with the seat backrest, such that the seat backrest rotates and reclines with respect to the seat frame by pivoting at the elastic pivots, wherein the seat is manufactured as one of a series of seats designed for installation on board an aircraft.

5. An elastic pivot for pivoting between a seat backrest and a seat frame, comprising:
a side beam positioned alongside and extending upwardly from the seat frame and comprising an elastic pivot comprising two flexion weaves positioned above the seat frame and crossing one another in an x-configuration, each of the flexion weaves extending from an one end of the side beam and being secured to and connecting with the seat backrest, wherein the elastic pivot is installed on a seat that is designed for use on-board a passenger transport vehicle.

6. The elastic pivot of claim 5, further comprising a seat pan positioned on the seat frame, wherein recline of the seat backrest is independent of seat pan angle.

7. The elastic pivot of claim 5, wherein the seat backrest has a flat plane against which a passenger's back would rest in use and wherein the two flexion weaves are positioned generally along the flat plane.

8. The elastic pivot of claim 5, wherein the seat backrest comprises an upper portion and a lower portion, and wherein the two flexion weaves are positioned to allow lumbar support along the lower portion when the seat backrest is reclined.

9. An elastic pivot for pivoting between a seat backrest and a seat pan, comprising:
the seat backrest comprising an upper portion and a lower portion, with the upper portion having a larger width than the lower portion;
a two-part side beam support, a first part of the side beam support positioned alongside the seat pan and a second part of the side beam support positioned above the seat pan, the second part of the side beam support supporting a first flexion weave and a second flexion weave that branch downwardly from a connection portion on the upper portion of the seat backrest,
the first flexion weave secured to a front portion of the second part of the side beam support and the second flexion weave secured to a rear portion of the second part of the side beam support, the first and second flexion weaves crossing one another to create an "X" configuration.

10. The elastic pivot of claim 9, wherein the elastic pivot is installed on a seat that is designed for use on-board a passenger transport vehicle.

11. The elastic pivot of claim 9, wherein recline of the seat backrest is independent of a seat pan angle.

12. The elastic pivot of claim 9, wherein the seat backrest has a flat plane against which a passenger's back would rest in use and wherein the first and second flexion weaves are positioned generally along the flat plane.

13. The elastic pivot of claim 9, the first and second flexion weaves are positioned to support a seat occupant's lumbar region along the lower portion when the seat backrest is reclined.

* * * * *